US006304689B1

United States Patent
Dingel et al.

(10) Patent No.: US 6,304,689 B1
(45) Date of Patent: Oct. 16, 2001

(54) GENERAL MULTI-FUNCTION OPTICAL FILTER

(75) Inventors: Benjamin Dingel; Masayuki Izutsu, both of Tokyo (JP)

(73) Assignee: Communications Research Laboratory Ministry of Posts and Telecommunications, Koganei (JP)

( * ) Notice: Subject to any disclaimer, the term of this patent is extended or adjusted under 35 U.S.C. 154(b) by 0 days.

(21) Appl. No.: 09/227,355

(22) Filed: Jan. 8, 1999

(30) Foreign Application Priority Data

Jan. 9, 1998 (JP) .................................................. 10-35323

(51) Int. Cl.[7] .................................................. G02B 6/293
(52) U.S. Cl. .................................. 385/24; 385/14; 385/15
(58) Field of Search .................................. 385/14, 15, 24

(56) References Cited

U.S. PATENT DOCUMENTS

| | | | |
|---|---|---|---|
| 5,313,535 | * | 5/1994 | Williams .................................. 385/14 |
| 5,353,262 | * | 10/1994 | Yakymyshyn et al. .............. 367/149 |
| 5,706,079 | * | 1/1998 | Kersey ................................. 356/5.09 |
| 5,982,518 | * | 11/1999 | Mizrahi ................................. 359/130 |
| 6,222,958 | * | 4/2001 | Paiam ..................................... 385/24 |

FOREIGN PATENT DOCUMENTS 52018378   10/1977   (JP) .

OTHER PUBLICATIONS

Inoue et al. Wavelength conversion using a light injected DFB–LD and a Mach–Zehnder filter with a ring resonator, IEEE Photonics Technology Letters, vol.: 7 No. 9, Sep. 1995.*

F. Bakhti, et al., Journal of Lightwave Technology, vol. 15, No. 8, pp. 1433–1437, "Design and Realization of Multiple Quarter–Wave Phase–Shifts UV–Written Bandpass Filters in Optical Fibers", Aug. 1997.

Janet L. Jackel, et al., IEEE Photonics Technology Letters, vol. 7, No. 3, pp. 318–320, "A Passband–Flattened Acousto–Optic Filter", Mar. 1995.

Hiroshi Takahashi, et al., Journal of Lightwave Technology, vol. 13, No. 3, pp. 447–455, "Transmission Characteristics of Arrayed Waveguide N X N Wavelength Multiplexer", Mar. 1995.

(List continued on next page.)

Primary Examiner—John D. Lee
Assistant Examiner—Sarah N. Song
(74) Attorney, Agent, or Firm—Oblon, Spivak, McClelland, Maier & Neustadt, P.C.

(57) ABSTRACT

A general multi-function optical filter for future smart, high density wavelength division multiplexed (WDM) communication and network system applications using a Michelson-GT interferometer (MGTI) is invented. MGTI filter is a typical Michelson interferometer in which one of its reflecting mirrors is replaced by Gires-Toumois resonator (GTR). One unique feature of this device is that it can function as channel passing, channel dropping and wide bandpass filters depending on the interferometer arm length difference. The output of these functions is available in a single port. Other interesting features of this element are (1) that linewidths of both channel dropping and channel passing filters are twice as narrow compared with typical Fabry-Perot filter having similar parameters, (2) that visibility of the output for three functions is always unity regardless of the mirror reflectance value, and (3) that bandpass filter has an excellent, near-perfect, box-like response function. Numerical results showing these characteristics are presented and other applications are discussed.

17 Claims, 16 Drawing Sheets

OTHER PUBLICATIONS

P. H. Lissberger, et al., Electronics Letters, vol. 21, No. 18, pp. 798–799, "Narrowband Position–Tuned Multilayer Interference Filter for Use in Single–Mode–Fibre Systems", Jul. 8, 1985.

M. Kuznetsov, Journal of Lightwave Technology, vol. 12, No. 2, p. 226–230, "Cascaded Coupler Machzehnder Channel Dropping Filters for Wavelength–Division–Multiplexed Optical Systems", Feb. 1994.

B. E. Little, et al., Journal of Lightwave Techololgy, vol. 15, No. 6, pp. 998–1005, "Microring Resonator Channel Dropping Filters", Jun. 1997.

Paul Urquhart, J. Opt. Soc. Amer. A., vol. 5, No. 6, pp. 803–812, "Compound Optical–Fiber–Based Resonators", Jun. 1988.

J. Stone, et al., Electronics Letters, vol. 23, No. 15, pp. 781–782, "Pigtailed High–Finesse Tunable Fibre Fabry–Perot Interferometers with Large, Medium and Small Free Spectral Ranges", Jun. 8, 1987.

Shoemaker D.: "Prototype Michelson Interferometer with Fabry–Perot Cavities" Applied Optics, US, Optical Society of America, Washington, vol. 30, No. 22. Aug. 1, 1991 pp. 3133–3138.

Oda K. et al.: "A Wide–Band Guided–Wave Periodic Multi/Demultiplexer with a Ring Resonator for Optical FDM Transmission Systems" Journal of Lightwave Technology, US, IEEE. New York vol. 6, Jun. 1, 1988, pp. 1016–1023.

Dingel B. B. et al.: "Multifunction Optical Filter with a Michelson–Gires–Tournois Interferometer for Wavelength–Division–Multiplexed Network System Applications" Optics Letters, US, Optical Society of America, Washington, vol. 23, No. 14, Jul. 15, 1998, pp. 1099–1101.

* cited by examiner

GENERAL MULTI-FUNCTION OPTICAL FILTER

BACKGROUND OF THE INVENTION

1. Field of the Invention

This invention relates to a multi-function optical filter intended for multi-wavelength optical communication system and high density wavelength-division multiplexed (WDM) network systems. Besides the optical spectrum region, the invention described herein can also be applied to other electromagnetic spectra such as microwave, milliwave, etc.

2. Description of Prior Art

Optical filters are key devices for multi-wavelength optical communication systems and high density wavelength-division multiplexed (WDM) network systems. In order to maximize the present 30 nm communication window supported by an erbium fiber amplifier for WDM network systems, there is an increasing demand for new tunable optical filters that have the following requirements; (1) wide free spectral range (FSR>30 nm), (2) narrow linewidth ($\Delta\lambda_{FWHM}$<0.3 nm), (3) High SNR or unity contrast or visibility, (4) tunable and (5) fiber compatible.

Furthermore, for next generation, highly complex combination of optical TDM-WDM network systems, an additional requirement, namely (6) programmability or multi-function capability, would be necessary to make a compact, versatile, economical and most importantly intelligent network system. Toward this goal, most if not all key devices in the network system such as an optical filter, an add/drop multiplexer (ADM), etc. need to be programmable, at best, or need to possess multi-function capabilities.

At present, most optical filters used in optical communication fields are dedicated, single-function devices. These single-function optical filters can be divided into two classes depending on the physical mechanism used in the filtering process namely; (1) grating-based filter and (2) resonant-based filter. Examples of grating-based filters are fiber bragg-grating (FBG) filter [F. Bakhati and P. Sansonetti, "Design and realization of multiple quarter-wave phase shifts UV-written bandpass filters in optical fibers", *J. Lightwave Technol.* vol. 15, 1433–1437, 1997], acousto-opto tunable filter (AOTF) [J. Jackel, J. Baran, A. d'Alessandro, and D. Smith, "A passband-flattened acousto-optic filter", *IEEE Photonics Tech. Letter,* Vol. 7, 318–320, 1995] and array-waveguide grating filter (AWGF) [H. Takahashi, K. Oda, H. Toba, Y. Inoue, "Transmission Characteristics of Arrayed Waveguide N×N Wavelength Multiplexer", *J. Lightwave Technol* vol. 13, 447–455, 1995]. Examples for resonant-based filters are multilayer dielectric film [P. H. Lissberger and A. K. Roy, "Narrowband position-tuned multilayer interference filter for use in single-mode-fiber systems", *Electr. Lett.* Vol. 21. No. 18, 798–799, 1985], Mach-Zehnder interferometer (MZI) [M. Kuznetsov, "Cascaded Coupler Mach-Zehnder Channel Dropping Filter for Wavelength-Division Multiplexed Optical Systems", *J. Lightwave Technol. vol.* 12, 227–230, 1994 ], ring resonator [B. E. Little, S. T. Chu, H.A. Haus, J. Foresi, and J.-P. Laine, "Microring resonator Channel Dropping Filters", *J. Lightwave Technol., vol.* LT-15, pp. 998–1005, 1997], Fox-Smith resonator [P. Urquhart, "Compound optical-fiber-based resonator," *J. Opt. Soc. Amer. A, vol.* 5, pp. 803–812, 1988], and Fabry-Perot resonator [J. Stone and L. Stulz, "Pigtailed high-finesse tunable fiber Fabry-Perot interferometers with large, medium and small free spectral ranges", *Elect. Lett. Vol.* 23, 781–782, 1987].

From among these different types of optical filters, fiber ring resonator (RR) and fiber Fabry-Perot resonator (FPR) have the highest potential to realize the above first 5 requirements in a compact and stable configuration. Unfortunately, these filters lack programmability or multi-function capability. Optical filters with some programmability in principle like a cascaded optical fiber lattice are impractical to implement because of the numerous phases and coupling parameters that need to be controlled.

SUMMARY OF THE INVENTION

This invention presents a new multi-function optical filter that can function as a channel passing (CP) filter, a channel dropping (CD) filter and a bandpass (BP) filter depending on the interferometer arm length difference $\Delta L$ or ratio $\gamma=\Delta L/d$ and reflectance R. CP filter accesses one channel of WDM signal and leave other channels undisturbed while CD filter performs the reverse functions. BP filter, on the other hand, allows only certain specified band of the spectrum to be transmitted while blocking other spectrum bands. Unlike other optical filters, the transmitted intensity outputs for all these three different functions are accessible in a single port. The first 5 requirements mentioned before can also be realized with this invention together with the multi-function capability.

Other unique features of this invention are (1) narrow linewidths for both MGTI-based CP and CD filters compared with a typical FPR having similar parameters, (2) unity contrast for all three functions and (3) excellent, near-perfect box-like response function for a BP filter.

This invention provides a multi-function optical filter, in which one of the reflecting mirrors of a Michelson interferometer or Tynman-Green interferometer is replaced by a Gires-Tournois resonator (GTR) having a resonator spacing d, that depends on the interferometer arm length difference $\Delta L$ or $\gamma$ (ratio of $\Delta L/d$) and reflectance R. Another implementation of the multi-function optical filter is a Mach-Zehnder interferometer in which one of the arms of Mach-Zehnder the interferometer contains a ring resonator with effective resonator perimeter length p=2d, and the coupling constant of the said ring resonator.

The multi-function optical filter is tunable by making the resonator spacing d variable by using a PZT as a base stage for one of the mirror of the resonator, or using either liquid crystal, thermo-optical, electro-optical, and light-sensitive material as an element inside the resonator, or using a micromachined fabrication of the resonator.

The multi-function optical filter is made or implemented using fiber, waveguide or bulk optics configurations.

The multi-function optical filter function as an optical Channel Passing (CP) filter when ratio $\gamma$ is equal to $n\lambda_0/2d$, wherein n stands for an integer including 0.

The multi-function optical filter also function as an optical Channel Dropping (CD) filter for some wavelength range $\Delta\lambda$ when ratio $\gamma$ is equal to $(2n+1)\lambda_0/4d$ wherein n stands for an integer and $\lambda_0$ for an arbitrary fixed center wavelength of the light source.

The multi-function optical filter also function as a Bandpass filter when ratio $\gamma$ is equal to or approximately to equal to 0.5.

Further features of the invention, its nature and various advantages will be more apparent from the accompanying drawings and following detailed description of the invention.

DESCRIPTION OF THE PREFERRED EMBODIMENT

Figure 1:
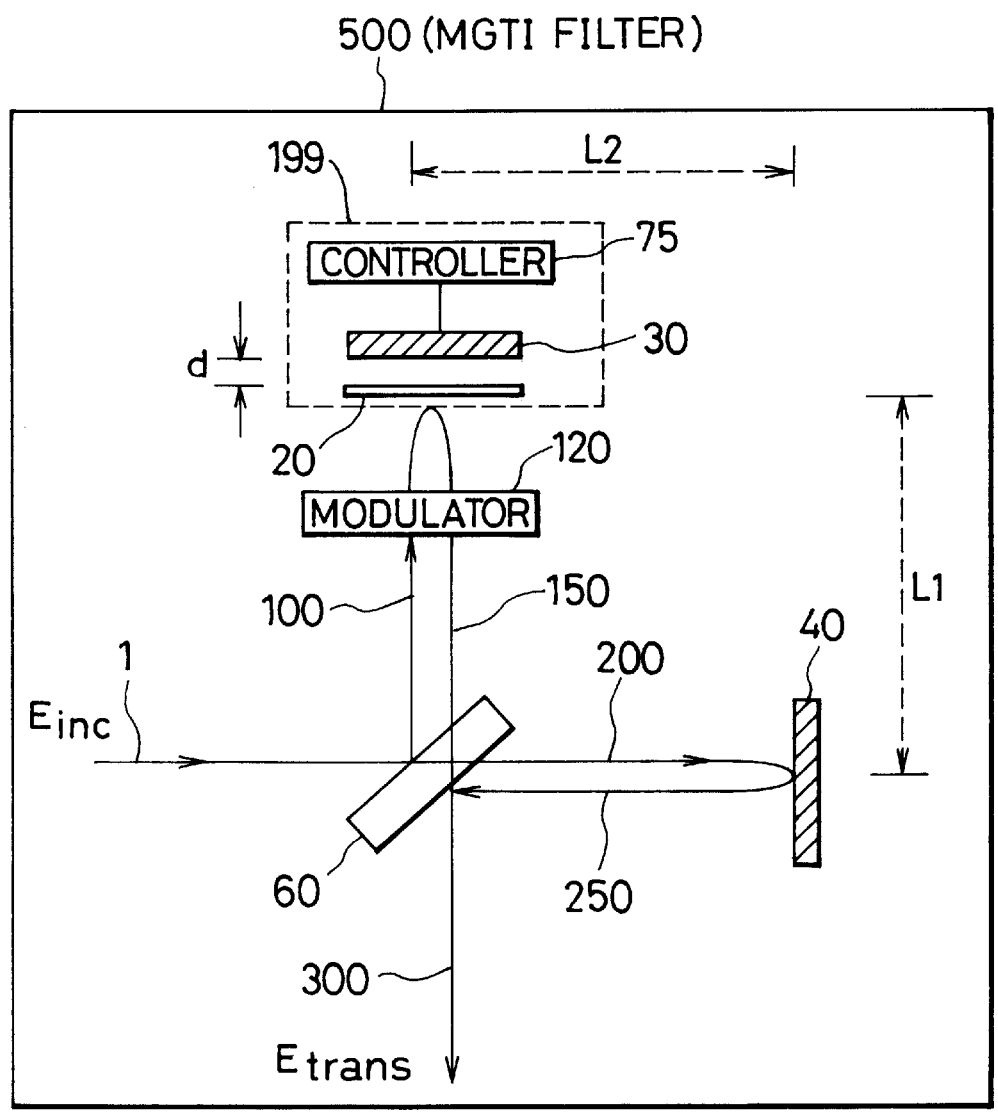
FIG. 1. is a schematic view illustrating the proposed new multi-function optical filter using a Michelson interferometer in which one of the reflecting mirror is replaced by Gires-Touiois resonator (GTR) with cavity spacing d.
Figure 2:
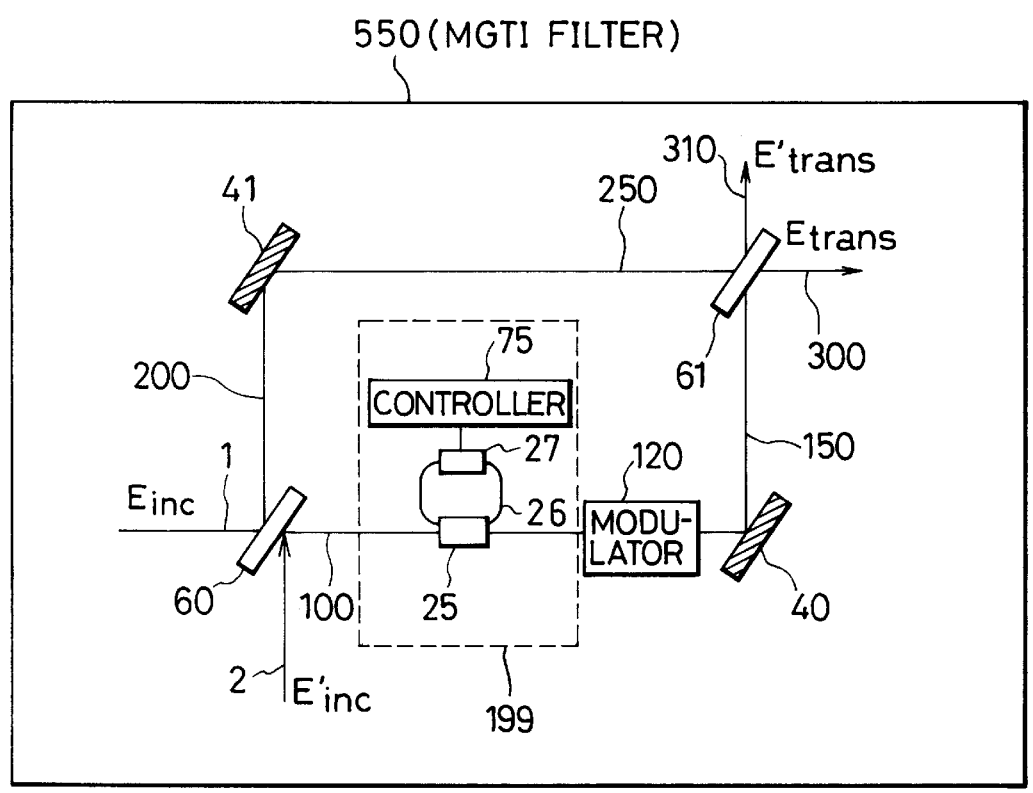
FIG. 2. is a schematic view illustrating the proposed new multi-function optical filter using a Mach-Zender interferometer in which one of the arm of the interferometer has a ring resonator having resonator length $\eta_3 \rho$.

The invention consists of a typical Michelson interferometer in which one of its reflecting mirror is replaced by a Gires-Toumois resonator (GTR) 199 (depicted in dashed box) as shown FIG. 1. This element is hereafter referred to as Michelson-GT Interferometer (MGTI) filter 500. Another implementation, as shown in FIG. 2, of the basic idea consists of a Mach-Zehnder interferometer whose arm contains a ring resonator with an effective perimeter length $\eta_3\rho$.

Figure 3:
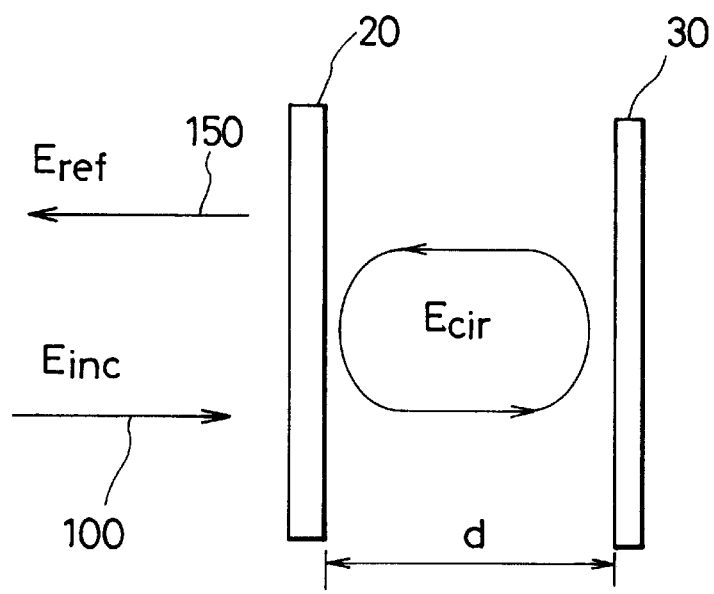
FIG. 3. is a schematic view illustrating a GT resonator with spacing d, onto which an incident beam $E_{inc}$ is incident onto the resonator. The reflected output beam $E_{ref}$ has the same amplitude as $E_{inc}$ but whose phase is modified depending on the front surface reflectivity $R=\rho^{1/2}$ and spacing d.
Figure 4:
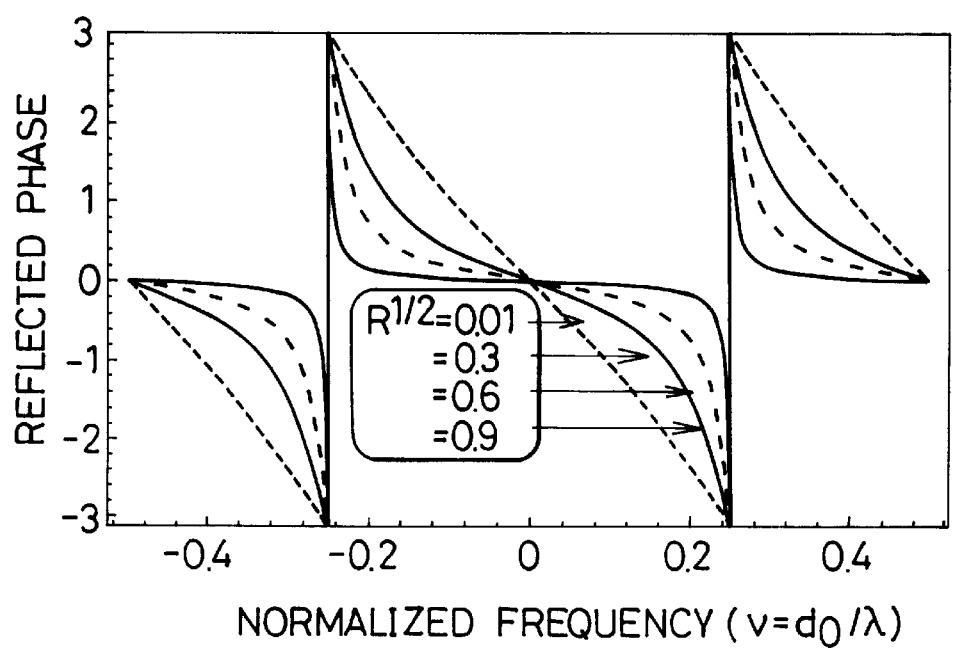
FIG. 4 is a diagram of the calculated result showing the reflected phase from GT resonator as a function of the normalised frequency $(d_0/\lambda)$ for different values of reflectivity R.

Here, the property of GTR 199 will first briefly be outlined before discussing the charcteristics of MGTI filter 500. A GTR 199 [F. Gires and P. Tournois, C.R. Acad. Sci. 258 (5), 612 (1964) and A. Yariv and P. Yeh, *Optical Waves in Crystal* (Wiley, N.Y., 1990) p. 219] is basically a lossless asymmetric Fabry-Perot resonator with partially reflecting mirror 20 and 100% reflecting back mirror 30 as shown in FIG. 3. Assuming a lossless system, beam 100 incident onto GTR 199 will be transformed into reflected beam 150 whose amplitude is the same as that of beam 100 but whose phase is different. The complex reflection coefficient and the reflected phase shift $\Theta$ of beam 150 due to GTR 199 can be derived as $$\beta e^{i\Theta} = \frac{E_{ref}}{E_{inc}} = \frac{\sqrt{R} + e^{-i2\theta}}{1 + \sqrt{R} e^{-i2\theta}} \quad (1)$$

$$\Theta(R, d) = -2\tan^{-1}\left(\frac{1-\sqrt{R}}{1+\sqrt{R}}\tan(kd)\right) \quad (2)$$

where $\beta$ (=1) stands for amplitude reflection coefficient, R (=$\rho^2$) for power reflectance of mirror 20, $\theta=2\pi\eta d/\lambda=$ k$\eta$d, d for resonator length, $\lambda$ for wavelength, and $\eta$ for refractive index (=1 for simplicity) of the material inside the resonator. The regenerative interference between the reflected waves coming from mirror 20 and mirror 30 of the resonator is the physical mechanism behind the periodic phase-versus-normalized frequency characteristic of GTR 199. The actual shape of phase-versus-normalized frequency curve is determined by the actual value of reflectance $\rho$ as shown in FIG. 4.

As shown in FIG. 1, light beam 1 incident onto the MGTI filter 500 is split into two beams 100 and 200 by beamsplitter (BS) 60. Beam 100 propagates through arm L1 and path-difference modulator 120 while beam 200 propagates through arm L2 of the interferometer. Then, both beams 100 and 200 are reflected back by mirror 40 and GTR 199 as beams 150 and 250, respectively, and then travel toward BS 60 before they are coherently added at BS 60 as output transmitted electric field $E_{trans}$ 300. The path-difference modulator 120 is any device that provides and controls the total path-difference ($\Delta L=L1-L2$) of beam 300 and can be placed in either of the arms of the interferometer.

The normalized transmitted output complex electric field $E_{trans}$ 300 and intensity $I_{trans}$ are given by $$\frac{E_{trans}}{E_{inc}} = -i\mathrm{Sin}\left[\frac{2k\Delta L - \Theta(R,d)}{2}\right]\exp\left[-i2k(L_1+L_2)+\frac{\Theta(R,d)}{2}\right] \quad (3)$$

$$\frac{I_{trans}}{I_{inc}} = \mathrm{Sin}^2\left[\frac{2kd\gamma - \Theta(R,d)}{2}\right] \quad (4)$$

where $\Theta(R,d)$ is reflected phase from GTR 199, $\gamma=\Delta L/d$ is the ratio between interferometer arm length difference $\Delta L(=L1-L2)$ and GTR spacing d, $E_{inc}$ and $I_{inc}$ are complex incident electric field and intensity, respectively. In this derivation the whole system is assumed to be lossless and the R:T ratio of BS 60 is 50:50.

As mentioned before, this new element has an inherent capability to function either as a CP filter, CD filter and BP filter depending on the value of $\gamma$ (or $\Delta L$) and reflectance R. These optical functions will be will briefly discussed by dividing them into three sections namely; $\gamma=n\lambda_0/2d$ [or $\Delta L=n\lambda_0/2$], $\gamma=(2n+1)\lambda_0/4d$ [or $\Delta L=(2n+1)\lambda_0/4$], and $\gamma=0.5$ [or $\Delta L=0.5$ d] with n being an integer.

Figure 5:
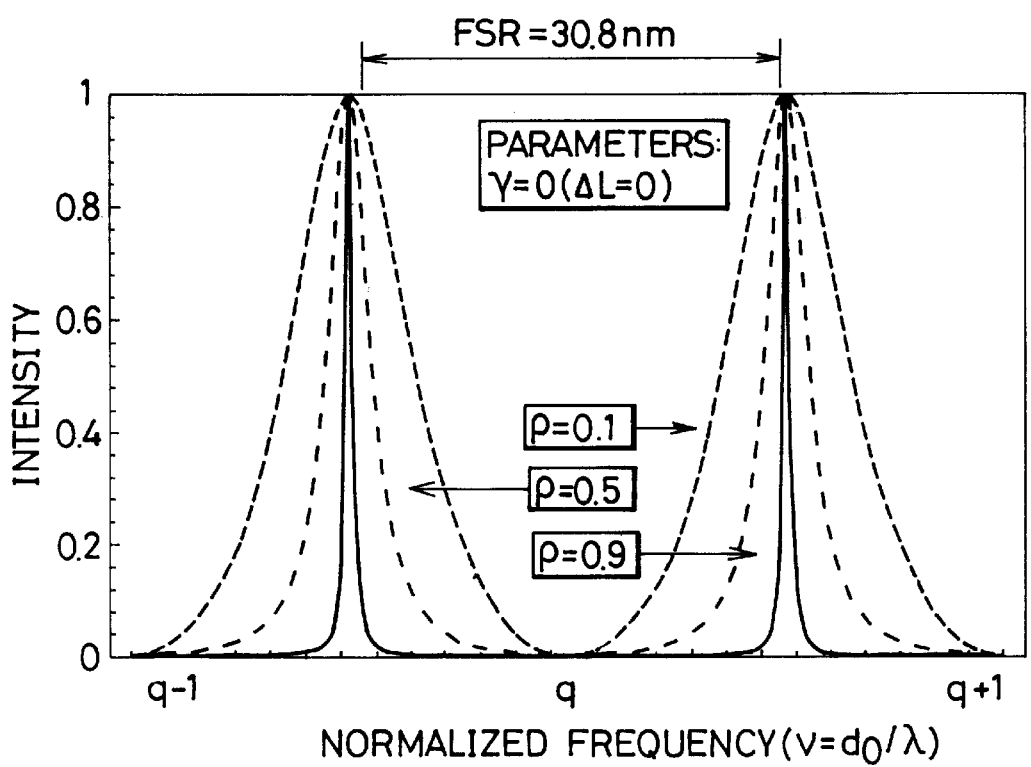
FIG. 5 is a diagram of the calculated result showing the transmitted intensity of MGTI filter when it functions as CP filter for three values of $\rho=0.1$, 0.5 and 0.9. The contrast is always one regardless of the value of $\rho$. (FSR=30.8 nm, d=25 $\lambda_c$, $\lambda_c$=1.540 mm).

First, MGTI filter 500 will function as a channel passing filter when $\gamma$ is 0 or $\Delta L=0$ where n=0. The calculated normalized transmitted intensity as a function of normalized frequency ($v=d/\lambda$) for different values of complex amplitude reflectance $\rho$ is shown in FIG. 5. The frequency response of the filter is periodic with the normalized frequency ($v=d/\lambda$). The 30.8-nm-FSR is obtained if we assume the center wavelength $\lambda_C$ of the light source, GT resonator length d, and refractive index $\eta$ are given by 1.540 $\mu$m, 25$\lambda_C$ and 1 (for simplicity), respectively. When $\gamma\neq0$ but $\Delta L$ is a multiple of $\lambda_0/2(n\neq0)$, MGTI will still function as CP filter for specified frequency range $\Delta v_1$ in which the term $kd\gamma=\pi n$ $(\Delta v_1+v_q)/v_q$ in (3) will still nearly equal $\pi n$ with $v_q=d/\lambda_0$ being a fixed center frequency.

Figure 6A:
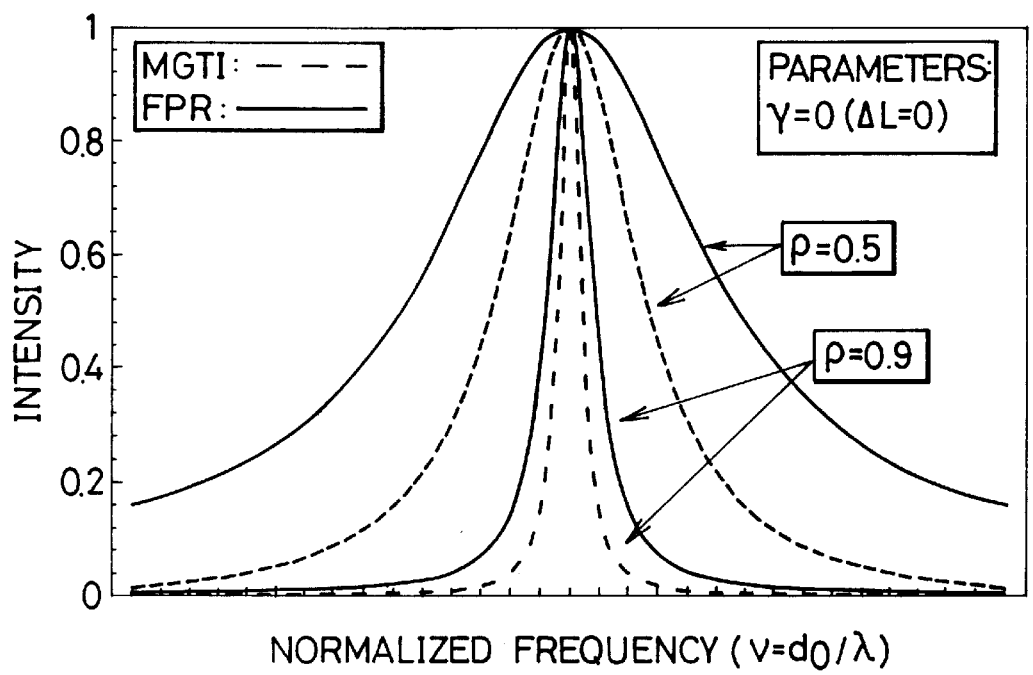
FIG. 6 is a diagram of the transmitted intensity showing narrower linewidth of MGT filter compared with FPR filter having the same parameter value (a). The numerical ratio between the linewidth of MGTI and FP filters as function of $\rho$ for same resonator spacing d is depicted in (b). The Mete linewidth is, at least, twice as narrow compared with FPR filter for $\rho>0.8$.
Figure 6B:
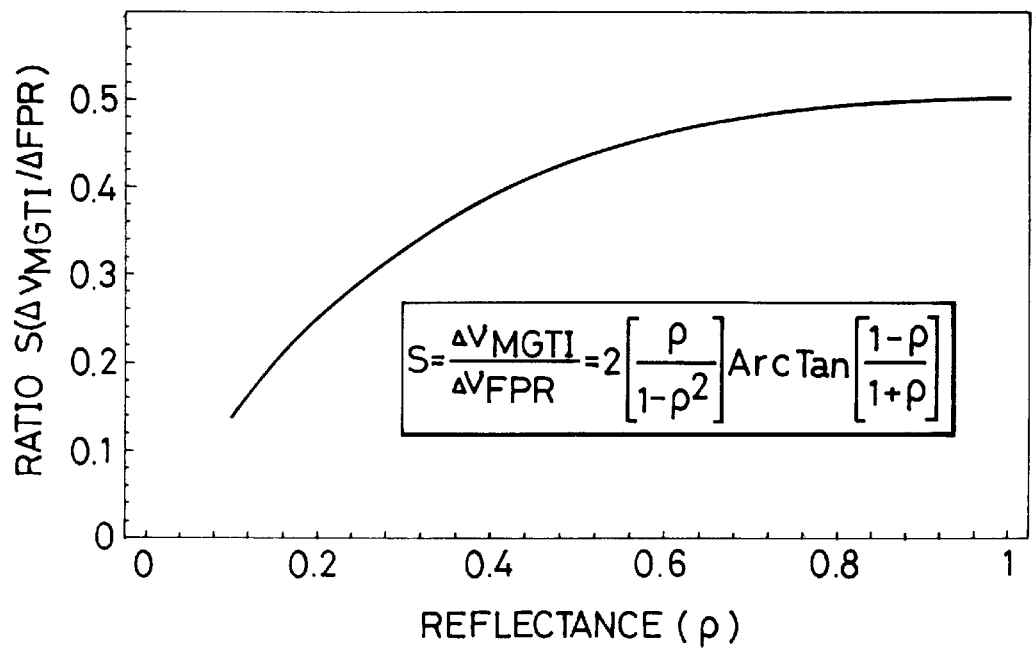

There are two superior features of this filter compared with conventional FPR having similar parameters. The first important feature of MGTI-based CP filter (dashed line) is its narrow linewidth compared with FPR (solid line) as shown in FIG. 6(a). The numerical ratio S of the linewidth (at FWHM) between the MGTI filter 500 and FPR filter for same spacing d can be derived as $$S = \frac{\Delta v_{MGTI}}{\Delta v_{FPR}} = 2\left[\frac{\rho}{1-\rho^2}\right]\tan^{-1}\left[\frac{1-\rho}{1+\rho}\right]. \quad (5)$$

and shown in FIG. 6(b). Here, a simplified expression for FPR's linewidth $\Delta v_{FPR}$ is used which is valid only for the case when $(1-\rho^2)<<1$. In the limit the value of $\rho$ approaches unity, the linewidth of the transmitted intensity of MGTI filter 500 can be seen to be, at least, twice as narrow compared with FPR's linewidth. For the case when $\rho^2<<1$, the value of the ratio S becomes much smaller. This narrower linewidth provides a significant advantage since it automatically doubles the Finesse (F) of MGTI filter 500 without any cascading effort.

The second interesting feature of this CP filter is its contrast or visibility C defined here as $C=[(I_{max}-I_{min})/(I_{max}+I_{min})]$, where $I_{max}$ and $I_{min}$ are maximum and minimum transmitted intensities, respectively. The contrast of the peak output intensity of MGTI filter 500 is always unity regardless of the value of reflectance $\rho$ provided that beamsplitter BS 60 has an equal splitting ratio (50:50 T:R). The above feature is absent in a typical FPR filter since its contrast is reflectance-dependent as seen in FIG. 6(a). Thus it is expected that the signal-to-noise (SNR) of the transmitted intensity coming from MGTI filter 500 is far better than the FPR filter especially when $\rho$ is within the range (0.1~0.8).

Figure 7:
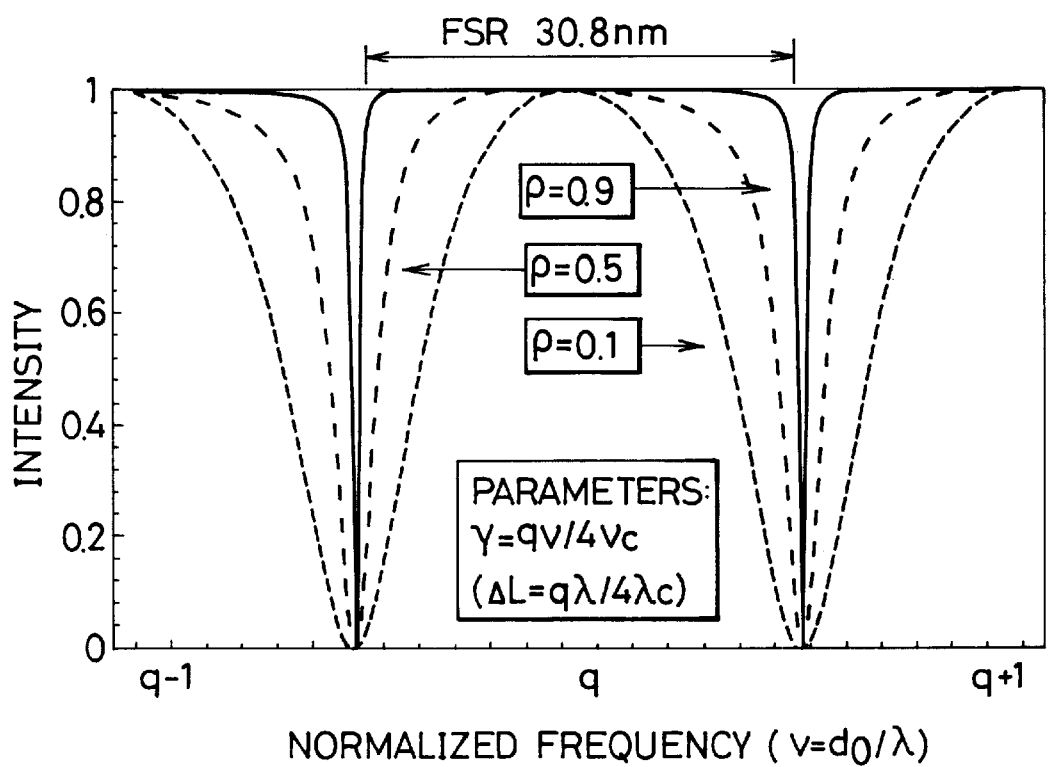
FIG. 7 is a diagram of the calculated result showing the transmitted intensity of MGTI filter when it functions as CD filter for three values of $\rho=0.1$, 0.5 and 0.9. The linewidth and contrast of MGTI-based CP filter are the same with MGTI-based CP filter except that transmitted output shape is reversed. (FSR=30.8 nm, d=25 $\lambda_c$, $\lambda_c$=1.540 mm, n=integer).

Second, MGTI filter 500 will function as a CD filter for a certain normalized frequency range $\Delta v=(v'_1<d/\lambda_0<v'_2)$ when $\gamma=(2n+1)\lambda_0/4d$ [or $\Delta L=(2n+1)\lambda_0/4$] with n being an integer and $\lambda_0/d$ being a fixed center normalized frequency. At this normalized frequency range $\Delta v$, the term $kd\gamma$ in (4) will nearly equal $\pi/2$ so that the output intensity is transformed from Sine into Cosine function. Just like the case of a CP filter, a 30.8-nm-FSR filter can be obtained if $\gamma=0.01$ with the parameters $d=25\lambda_0$, n=0, and $\lambda_0=\lambda_c=1.540$ $\mu$m. The calculated transmitted intensity as a function of normalized frequency with $\gamma=0.01$ for different values of reflectance $\rho$ is shown in FIG. 7. The linewidth and contrast are the same as in the case of MGTI-based CP filter and superior compared with FPR filter.

Figure 8:
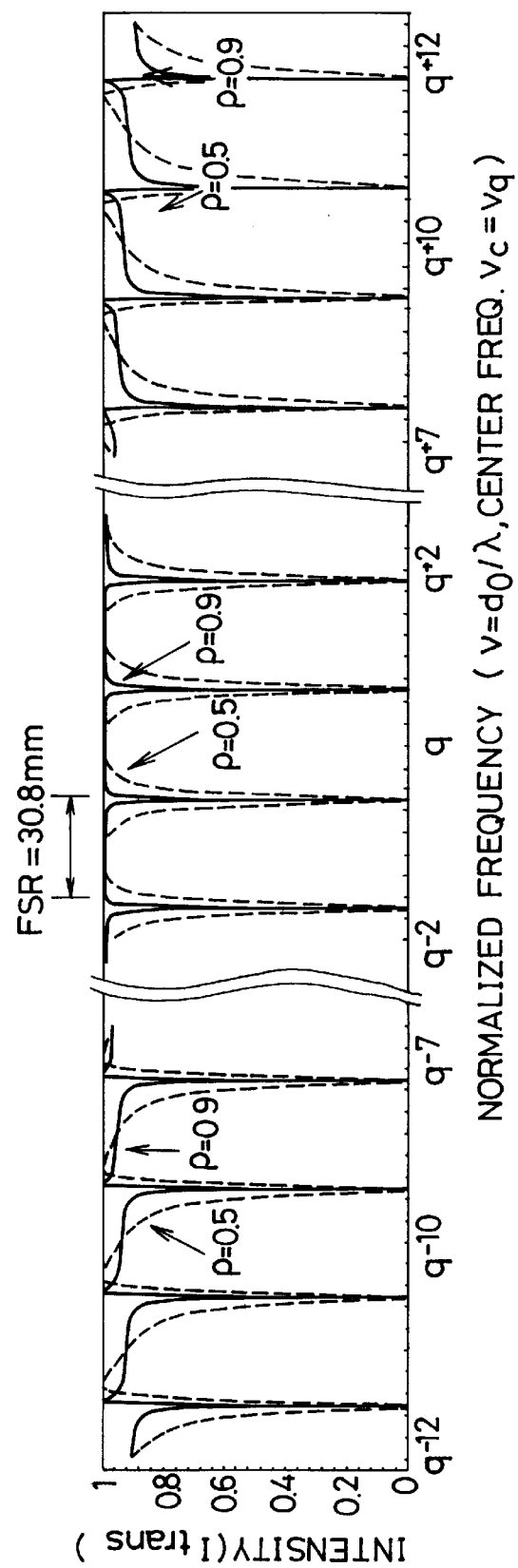
FIG. 8 is a diagram of the calculated result showing the transmitted intensity of MGTI filter when it functions as CD filter for two values of 0.5 and 0.9 across many FSR ranges. The shape transmitted output begins to be noticedly distorted at 8 FSRs away from the center. (FSR=30.8 nm, d=25 $\lambda_c$, $\lambda_c$=1.540 mm, n=integer).
Figure 9:
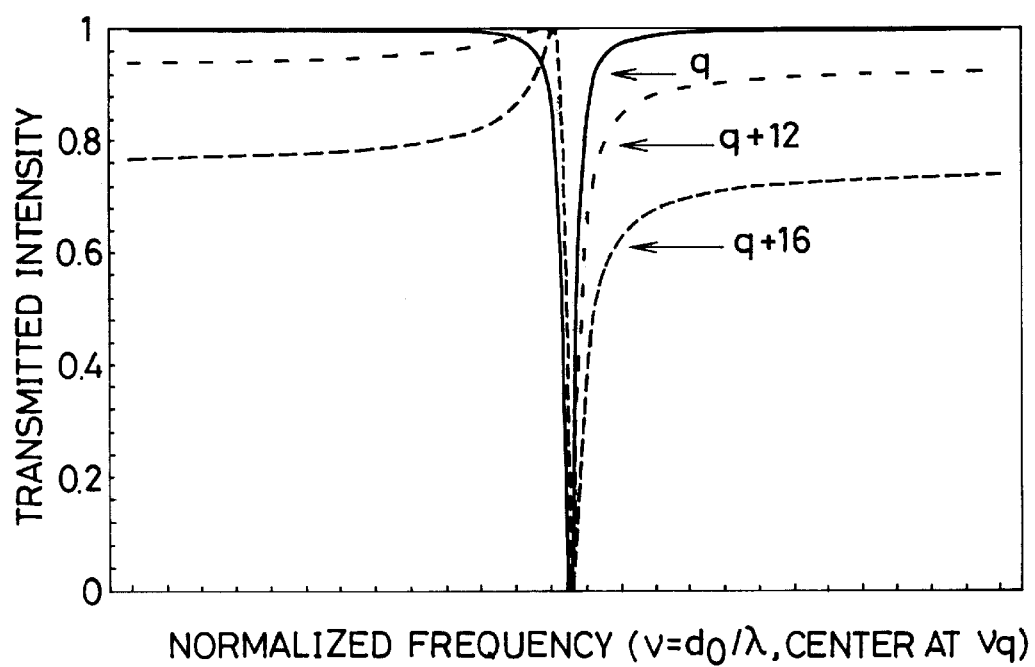
FIG. 9 is a diagram of the calculated result showing the superposition of transmitted intensity of MGTI-based CD for 3 different FSR ranges ($q=q_0$, $q_0+8$ FSR, $q_0+16$ FSR).

Compared with FIG. 5, the intensity output is just the inverse of the output of a CP filter although there is a small asymmetry in the frequency response as the frequency departs from $d/\lambda_0$). Since the transmitted intensity response of CD is not periodic for all normalized frequency range, the effective normalized frequency range $\Delta v$ of MGTI-based CD filter is determined by $\gamma$. For $\gamma=0.01$ with a FSR equal to 30.8 nm and $\lambda_c=1.540$ $\mu$m, the effective wavelength range $\Delta\lambda$ where MGTI filter still functions as channel dropping is 8 times the FSR or nearly 240 nm as shown in FIG. 8. A normalized frequency detuned from the center frequency $(d/\lambda_0)$ by about 8 FSR does not show any abrupt distortion as compared to a normalized frequency detuned by 16 FSR as shown in FIG. 9. A wavelength deviation of about 50 nm from $\lambda_0$ will introduce an insignificant 3.2% phase change from $\pi/2$ term and will not pose a problem for channel dropping filter application.

Figure 10:
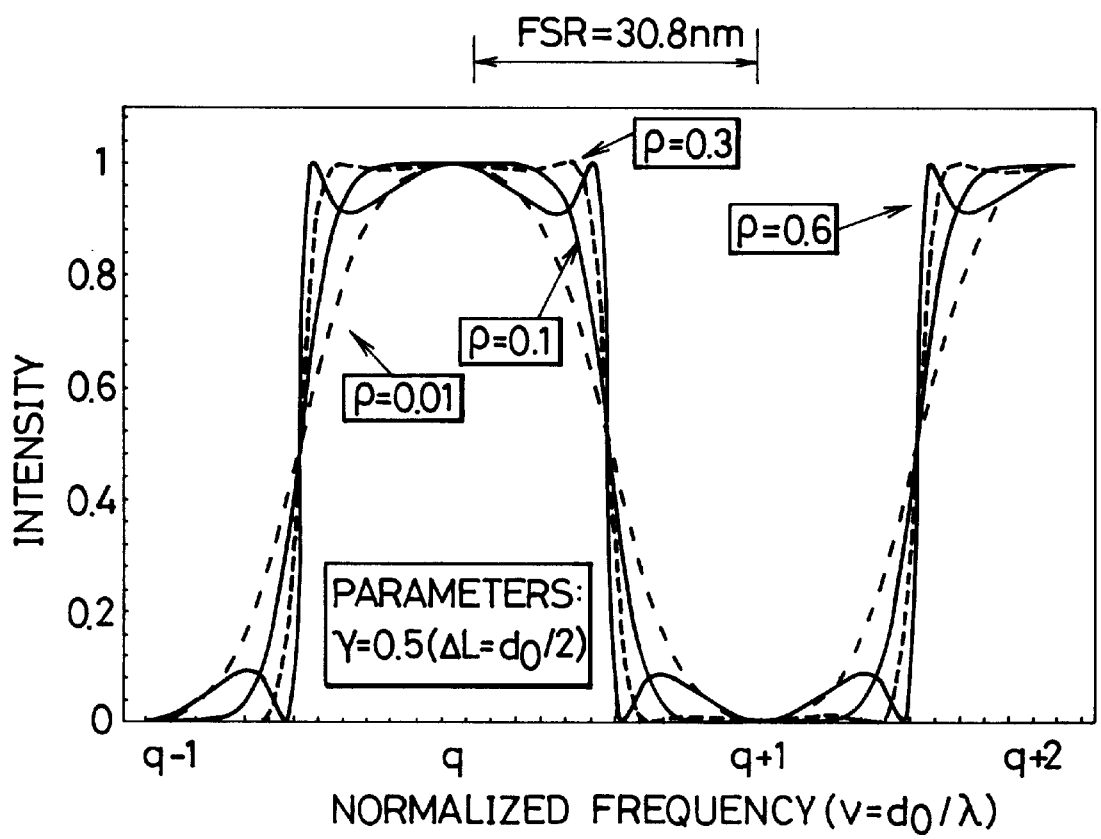
FIG. 10 is a diagram of the calculated result showing the transmitted intensity of MGTI filter when it functions as BP filter for four values of $\rho=0.01$, 0.1, 0.3 and $\rho=0.6$. The output has nearly perfect box-like response with linewidth equal to FSR when the $\rho=0.3$.

MGTI filter 500 will function as a bandpass (BP) filter when $\gamma=0.5$ or $\Delta L=0.5$ d. The calculated transmitted intensity as a function of the normalized frequency for different values of reflectance $\rho$ is shown in FIG. 10. The intensity output has a nearly perfect, box-like response with linewidth equal to FSR when $\rho$ is within 0.15–0.3. Increasing the value of $\rho$ from 0.3 to a higher value enlarges the edge component (sideband or ripple) frequencies while decreasing the value of $\rho$ from 0.15 changes the shape of the transmitted intensity output from a square to a sine-like shape. Compared with other methods of generating a box-like frequency response, the MGTI filter 500 is very simple with superior characteristics. It does not require multiple cascading of filters which makes the device compact and simple.

Figure 11:
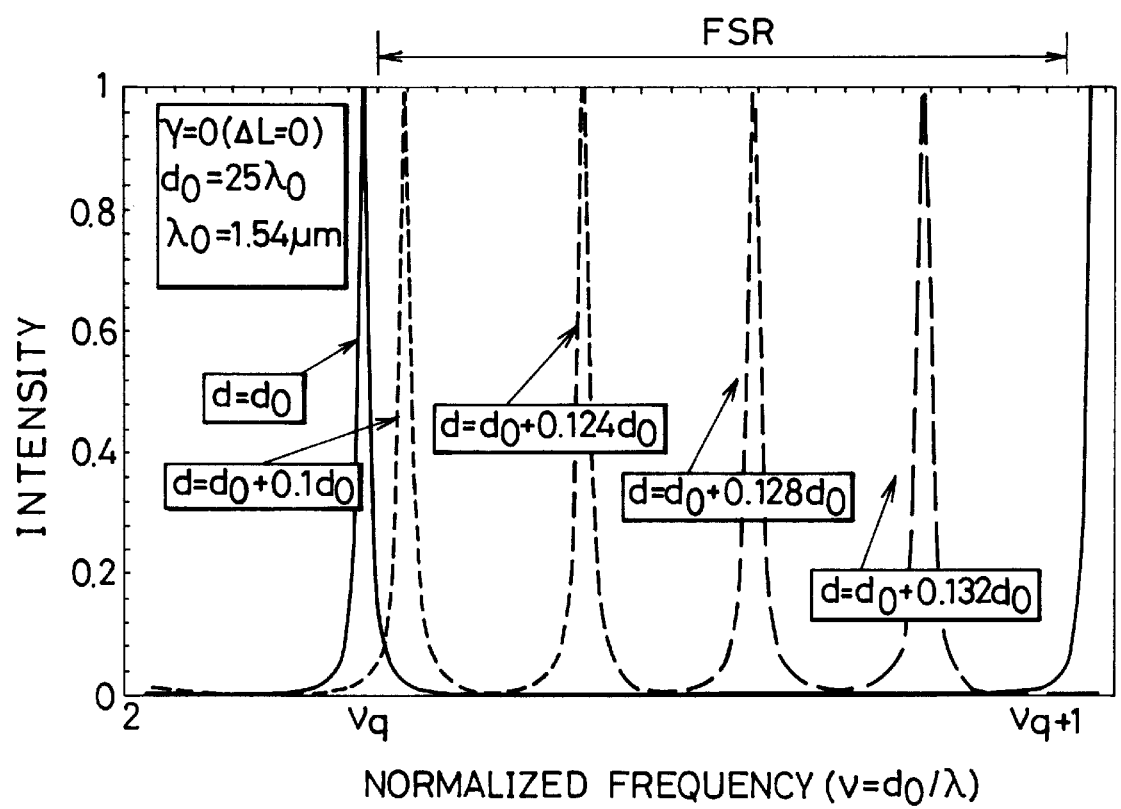
FIG. 11 is a diagram of the calculated result showing the transmitted intensity of MGTI-based CP when the resonator spacing d is scanned for four different values (d=d0+0.1$\lambda$, d0+0.18$\lambda$, d0+0.25$\lambda$, d0+0.32$\lambda$).
Figure 12:
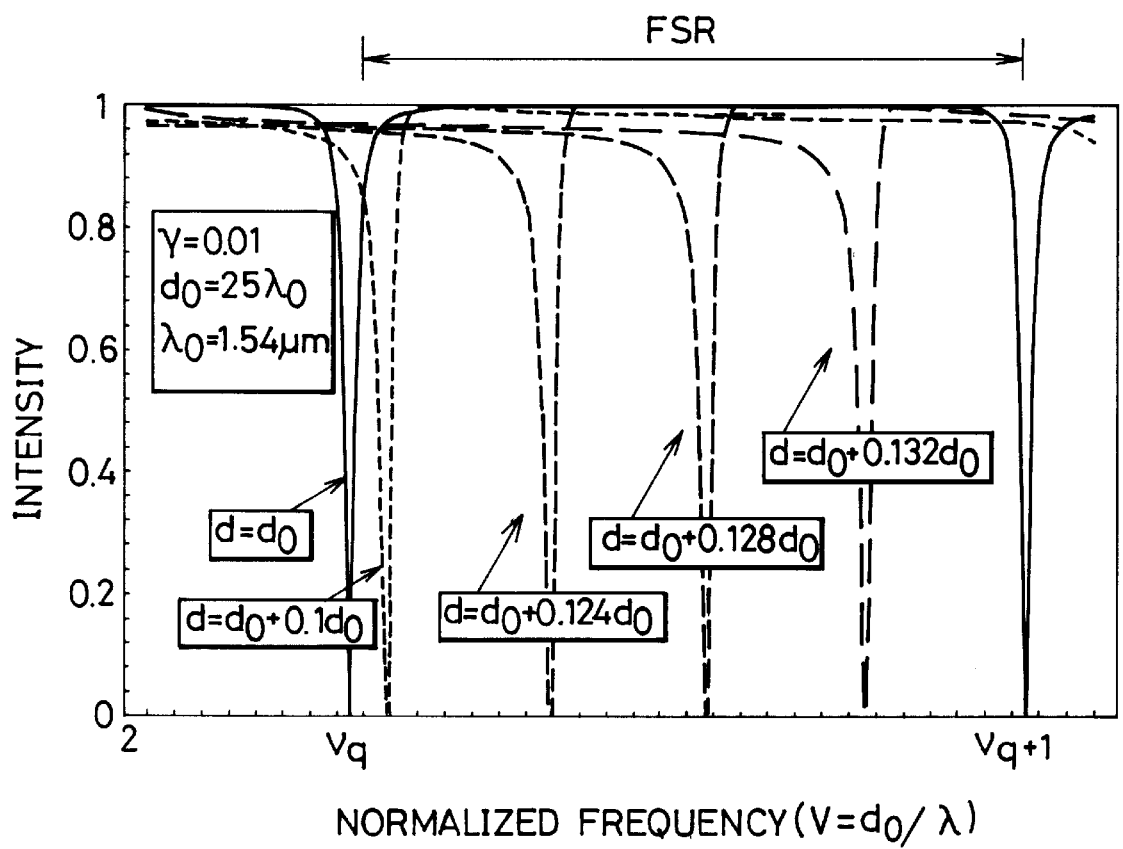
FIG. 12 is a diagram of the calculated result showing the transmitted intensity of MGTI-based CD when the resonator spacing d is scanned for four different values ( d=d0+0.1$\lambda$, d0+0.18$\lambda$, d0+0.25$\lambda$, d0+0.32$\lambda$).
Figure 13:
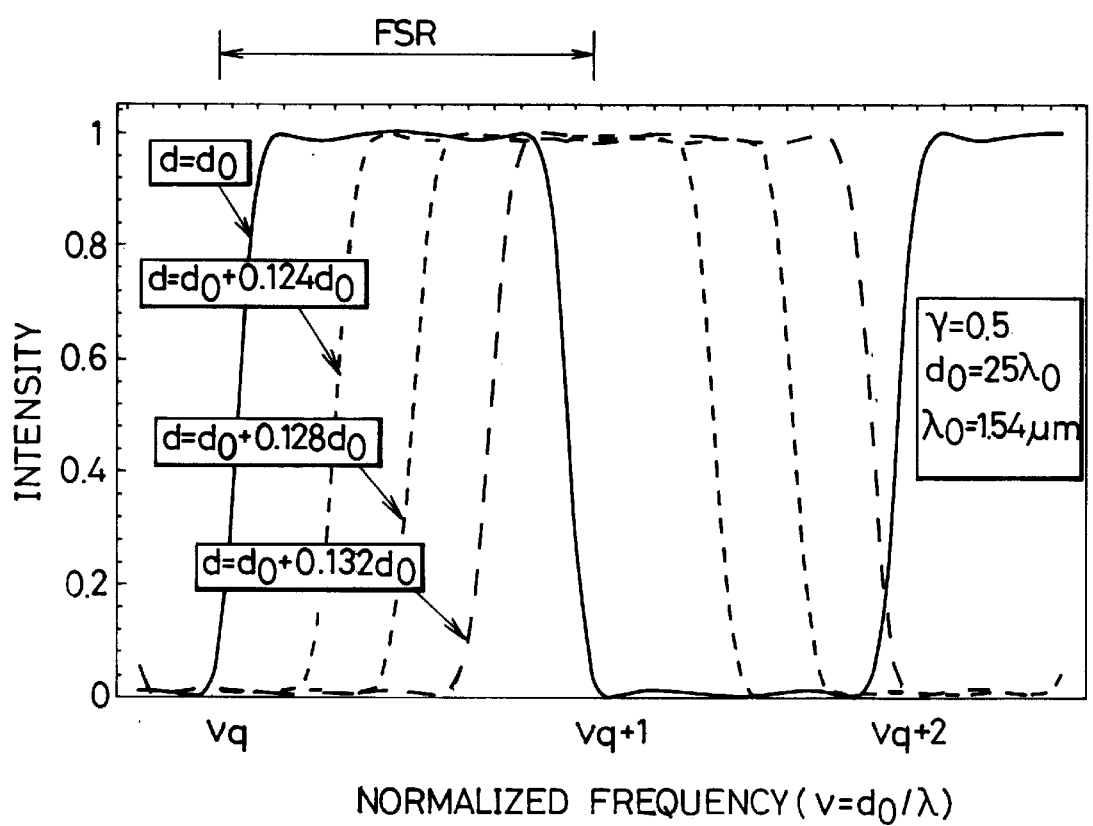
FIG. 13 is a diagram of the calculated result showing the transmitted intensity of MGTI-based BP when the resonator spacing d is scanned for three different values (d=d0+0.18$\lambda$, d0+0.25$\lambda$, d0+0.32$\lambda$).

When GTR 199 is constructed such that the resonator spacing d can be made variable, the MGTI filter will also have a tunability characteristic. There are various ways to realize this goal such as the use of (1) PZT as the base stage of one of the mirror in the resonator, (2) electro-optical or thermo-optical or light-sensitive materials as an element inside the resonator, (3) microchannel fabrication of the resonator, etc. Tuning speed will depend on the choice of a particular method. These various methods together with corresponding manual or electrical controller are schematically depicted by block 75 in FIG. 1. The transmitted intensities for different values of d ($d=d_0$, $d_0-0.1\lambda_0$, $d_0-0.18\lambda_0$, $d_0-0.32d_0$) are shown in FIG. 11, FIG. 12 and FIG. 13 for CD, CP and BP filters respectively, which show good tunable properties.

Figure 14:
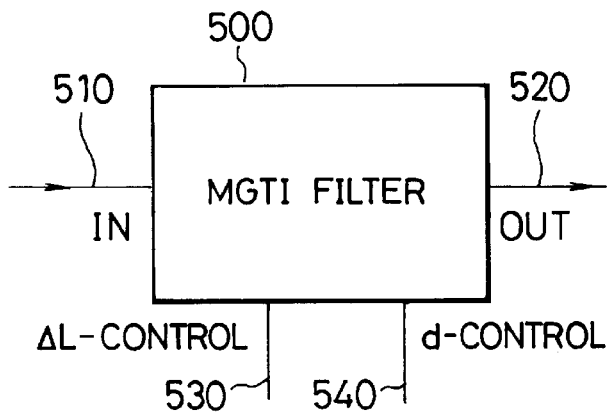
FIG. 14(a) is a schematic diagram of a 4-port MGTI filter 500 having an input port 510, outport port 520 and two control ports 530 and 540 to control $\Delta L$ and d respectively.
FIG. 14(b) is a schematic diagram of a 6-port Mach-Zehnder interferometer-based MGTI filter 550 having input ports (510, 511), outport ports (520, 521), and two control ports 530 and 540 to control $\Delta L$ and d respectively.
Figure 14:
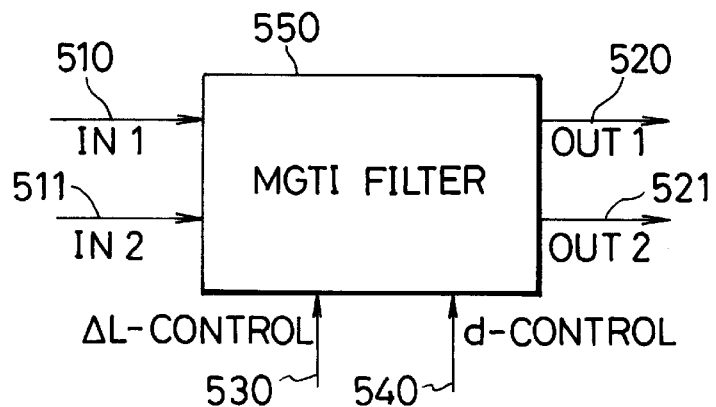

Beside the optical function of filtering, the MGTI filter can be combined with other optical elements to produce other optical functions such as an Add/Drop Multiplexer, a wavelength router, etc. For the purpose of brevity, MGTI filter 500 will be depicted as a block box with 4 ports as shown in FIG. 14 where 510, 520, 530 and 540 stand for an input beam port, an output beam port, a path-difference ($\Delta L$) controller port and a resonator-spacing d controller port, respectively. An additional control port to adjust the reflectance R of mirror M1 can be added to the device by using graded reflectivity mirror M1 together with a sliding technique. Ports 530 and 540 can accept either optical or electrical signals as control signals to change $\Delta L$ and d by providing suitable interface devices.

Figure 15:
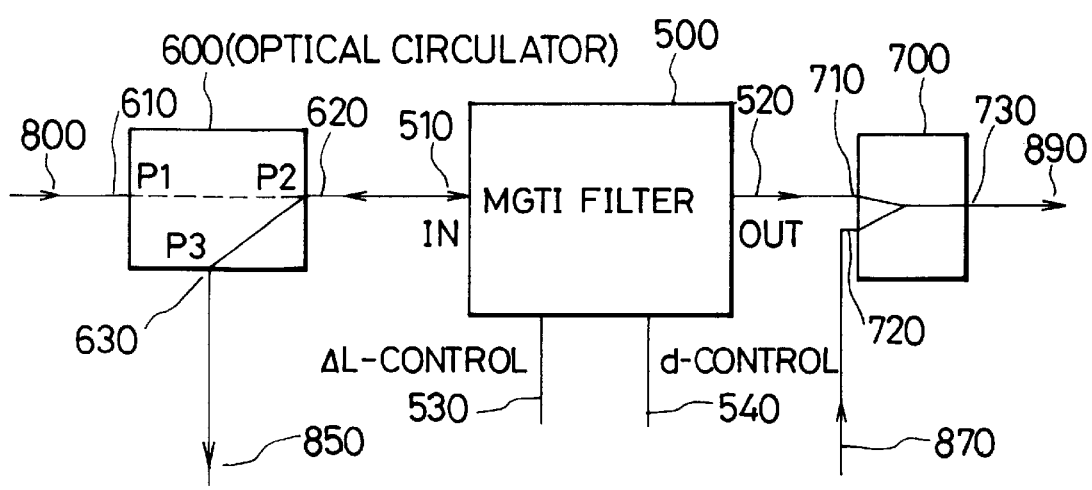
FIG. 15 is a schematic diagram of an Add/Drop Multiplexer implementation using MGTI filter 500 and two optical circulators 600 and 700.

When MGTI filter 500 is placed in between two three-port optical circulator 600 and 700, a switchable, tunable Add/Drop WDM multiplexer can be realized as shown in FIG. 15. The first optical circulator 600 has an input port #1 610 and output ports 620 and 630 while the second optical circulator 700 has input ports 710 and 720 and output port 730. As an Add/Drop WDM filter for a single, specified frequency, the MGTI filter is set as channel dropping CD filter with a fixed resonator spacing do. A beam 800 with wavelengths $\lambda_0$-$\lambda_N$ incident onto port 610 will travel the path 610→620→510→520→710→730. Since MGTI filter 500 is set as a CD filter for $\lambda_5$, for example, all wavelengths ($\lambda_0$-$\lambda_4$ and $\lambda_6$-$\lambda_N$) except $\lambda_5$ will exist at 730 as beam 890 while $\lambda_5$ will be reflected back by 500, passes through 510->620 and exists or "drops" at output port 630 as beam 850. A different input beam 870 with wavelength $\lambda_{5N}$ incident onto port 720 of optical coupler or combiner 700 will be directed to exist at 730 to join or "add" to other wavelengths ($\lambda_0$-$\lambda_4$ $_{and}$ $\lambda_0$-$\lambda_N$) as beam 890. This dual-function completes the function of an Add/Drop WDM Multiplexer for a single, specified wavelength $\lambda_5$.

Under the same conditions mentioned above if the MGTI-filter 500 is switched from CD into CP filter by changing $\Delta L$ using 530, the whole system will function as an Add/Drop WDM Multiplexer not for a single, specified wavelength $\lambda_5$ but for the complementary wavelength band ($\lambda_0$-$\lambda_4$ and $\lambda_6$-$\lambda_N$). Thus the use of the MGTI-based filter allows an ordinary Add/Drop Multiplexer to have an additional function as a switchable complementary Add/Drop Multiplexer.

Under the same conditions mentioned above if the MGTI-filter 500 has an additional controller module to vary the effective reflectance R of mirror M1 such that the MGTI filter can be switched from CD into BP filter using appropriate R and $\Delta L$, the whole system will function as an Add/Drop WDM filter for specified frequency bands instead of an Add/Drop WDM filter for single frequency $\lambda_5$ or its complementary wavelength band ($\lambda_0$-$\lambda_4$ and $\lambda_6$-$\lambda_N$).

Figure 16:
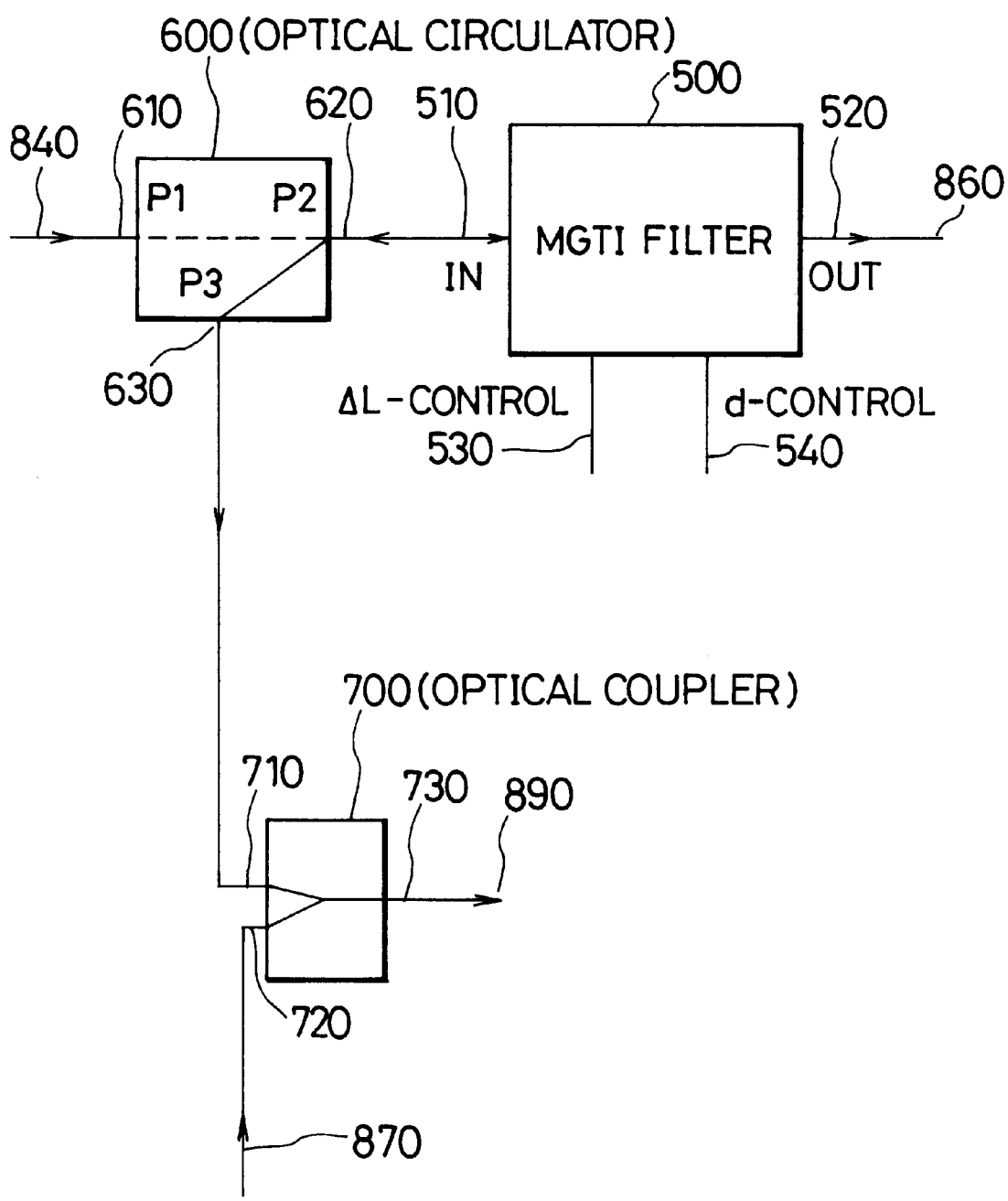
FIG. 16 is a schematic diagram of an another implementation of Add/Drop Multiplexer implementation using MGTI filter 500, one optical circulator 600 and a directional coupler 700.

Another implementation of the Add/Drop Multiplexer using an optical circulator and directional coupler and a MGTI-based CP filter is shown in FIG. 16. An incident beam 840 ($\lambda_0$-$\lambda_N$) is incident onto MGTI-based CP filter through port 610→ port 620 of an optical circulator 600. Optical beam with wavelength $\lambda_5$ is "dropped" or transmitted as beam 860 while beam with wavelengths ($\lambda_0$-$\lambda_4$ and $\lambda_6$-$\lambda_N$) are reflected. The reflected beam passes through the optical circulator by port 630 before they are incident to the optical coupler or combiner 700 and exist as beam 890. An additional beam $\lambda_{5N}$ 870 is "added" into the system through port 720 of a coupler to complete the function of the Add/Drop Multiplexer.

Another implementation of the Add/Drop Multiplexer with no additional component is the Mach-Zehnder interferometer-based MGTI filter shown in FIG. 2. In this filter, it is basically the same with Michelson inteferometer-based MGTI filter except that the Mach-Zehnder-based MGTI filter has two inputs ports and two output ports. As shown in FIG. 2, a beam $E_{inc}$ 1 incident onto mirror 60 will be divided into two beams 200 and 100. Beam 200 will travel through the arm, reflected by mirror 41 and incident to mirror 61 as beam 250. On the other hand, beam 100 will propagate through the ring resonator 199 and path-length modulator 120, reflected by mirror 40 before it is incident to mirror 61 to coherently add with beam 250 to obtain the output beam $E_{tran}$ 300 in one port and another output beam $E_{tran}$ 310 in the other port. Beam 310 is the conjugate of beam 300 which means that all wavelenghts that are not transmitted as beam 300 will be transmitted as beam 310. Another possible arrangement for incident beam to be injected into Mach-Zehnder inteferometer is shown in FIG. 2 where beam $E'_{inc}$ is incident onto the otther side of mirror 61.

The ring resonator 199 which comprises an optical coupler 25, any optical medium 26 such as planar wavegiude or fiber or free-space to form the ring resonator will function like the GT resonator. The perimeter length p=2d of the ring resonator 199 can be made variable by using liquid crystal, thermo-optical, electro-optical and light sensitive materials as part of the material 27 of the ring resonator. The length d can then be changed by a controller 75. For the purpose of brevity, Mach-Zehnder-based MGTI filter 550 will be depicted as a block box with 6 ports as shown in FIG. 14(*b*) where (510, 511), (520, 521) 530, and 540 stand for input beam ports, output beam ports, a path-difference ($\Delta L$) controller port and a resonator-spacing d controller port, respectively. An additional control port to adjust the coupling constant of ring resonator coupler can be added to the device. Ports 530 and 540 can accept either optical or electrical signals as control signals to change $\Delta L$ and d by providing suitable interface devices.

Mach-Zehnder based MGTI filter functions as an Add/Drop Multiplexer when it is set to operate as channel dropping filter for specified wavelength for example $\lambda_5$. An incident beam ($\lambda_0$-$\lambda_N$) is incident onto Mach-Zehnder based MGTI filter CP filter through port 510 will be spectrally divided into beam ($\lambda_0$-$\lambda_4$, $\lambda_6$-$\lambda_N$) which exists at output port 520 and beam $\lambda_5$ which exists at output port 521. An additional beam $\lambda'_5$ is "added" into the system through input port 511 to complete the function of the Add/Drop Multiplexer. If the incident beam ($\lambda_0$-$\lambda_N$)is injected through input port 511, then beams ($\lambda_0$-$\lambda_4$, $\lambda_6$-$\lambda_N$) will exist at output port 521 and beam $\lambda_5$ exists at output port 520. Furthermore, Mach-Zehnder based MGTI filter will also function as an Add/Drop Multiplexer when it is set to operate as an channel passing filter for specified wavelength for example $\lambda_5$. In this case, the output performance of the device is similar to the case when the input beam is injected into port 511 as explained above.

Figure 17:
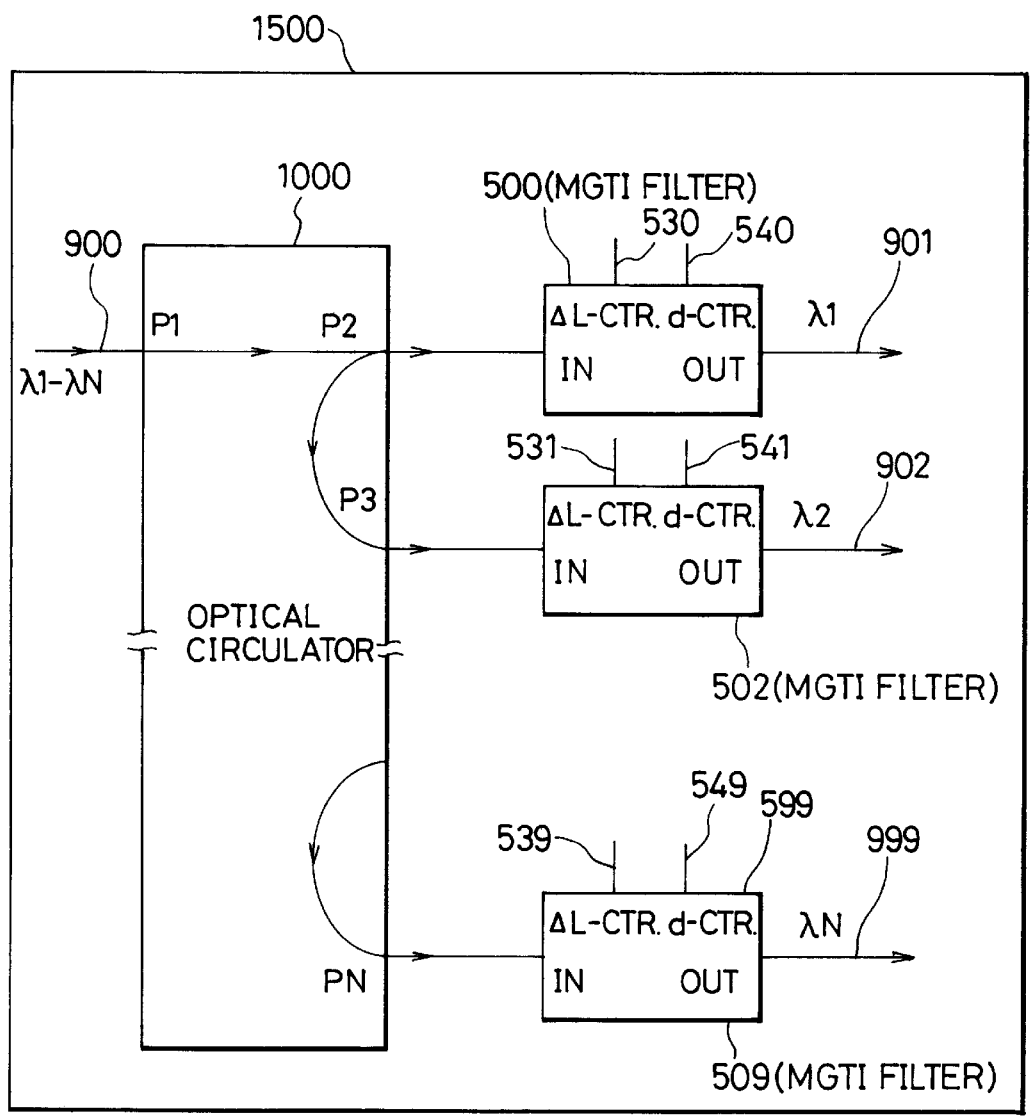
FIG. 17 is a schematic diagram of an implementation of a wavelength router or grating using an array of MGTI-based CP filter with different d, together with a N-port optical circulator.

Beside the function of an Add/Drop Multiplexer, a WDM grating (similar to the function of an Array Waveguide Grating) or wavelength router 1500 function can also be realized when a series of MGTI-based CP filters 500 with different centered wavelengths $\lambda_N$ (500, 502, 509, etc. by having different resonator spacing $d_N$) are combined with a N-port optical circulator 1000 as shown in FIG. 17. An input beam 900 with wavelength ($\lambda_1$-$\lambda_N$) will propagate from P1 to P2 of the optical circulator 1000 before it is incident onto MGTI filter 500 which transmits only one specified wavelength $\lambda_1$ as optical beam 901 and reflects the rest. The reflected beam will propagate back to circulator 1000 from P2 to P3 before entering MGTI filter 502 which picks up one specified wavelength $\lambda_2$ and transmits it as optical beam 902. This process continues up to port N of the optical circulator to form spatially separated N optical beams 901–995. By providing suitable interface devices at port ΔL-and port d-control ports that receive time-dependent signal, the device can selectively, spatially, temporally re-route or re-direct any particular wavelength $\lambda_N$ at any particular port. Other variations of the implementations of a wavelength router are also possible.

It is noted that the above series of MGTI filters are all CP filters. If any one of the above CP filters is switched to a CD filter by their respective port 531 (or 532, etc), the final output beam will change. If a particular filter (for example) 506 functions as CD filter, all the "above filters" 500–505 will transmit only their respective wavelengths while filter 506 transmits the rest of the wavelength signals. The "below filters 507–509" will transmit no or zero-output intensities.

Figure 18:
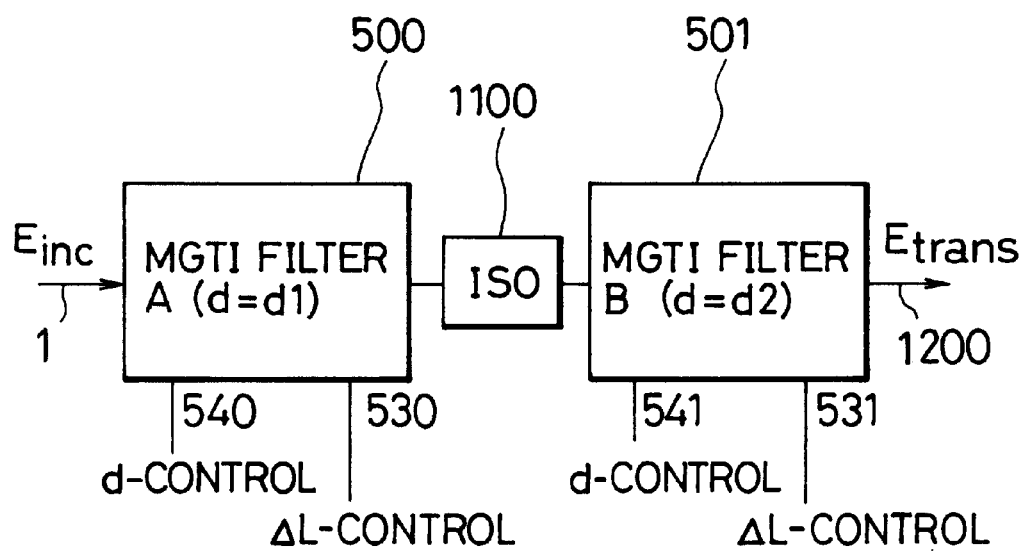
FIG. 18 is a schematic diagram of a cascaded MGTI filter using a two GTRs with two different spacings $d_N$.

The linewidth (or bandwidth) of MGTI-based CP and BP filters can be further narrowed by cascading two or more CP (BP) filters with similar or different resonator spacing using vernier effect as illustrated in FIG. 18 for two MGTI filters (A and B). The purpose of the isolator is to avoid resonating interference between these two filters. On the otherhand, the linewidth of MGTI-based CD filter will be broadened instead of being narrowed by cascading process.

Again it is noted as an important point that the output of these three different filtering functions of the MGTI filter is accessible in a single output port. This important feature together with the multi-function characteristics of the new device offers new design parameters for future smart WDM architecture which could considerably reduce the number of optical components needed in a total system, reduce cost and size, and offer system flexibility.

As a summary, a new multi-function optical filter is proposed for future smart, highly-density WDM applications. The device can function as a channel dropping (CD) filter, channel passing (CP) filter and bandpass (BP) filter depending on ΔL of the interferometer. Linewidths of both CD and CP filters are twice as narrow compared with a typical FPR filter having similar parameters and their contrasts are always unity. A BP filter has an excellent, near-perfect, box-like response function. Fiber and waveguide implementations of the proposed filter are also possible. Variations using polarization elements and a GT resonator are also straightforward.

What is claimed is:

1. A general multi-function optical filter, in which one of reflecting mirrors of a Michelson interferometer or Tynman-Green interferometer is replaced by a Gires-Toumrois resonator (GTR) with resonator spacing d, that depends on an interferometer arm length difference ΔL or γ (ratio of ΔL/d) and reflectance R.

2. The multi-function optical filter according to claim 1 acting as an optical channel dropping filter, further comprising an optical circulator and an optical coupler or an optical combiner, to function as an add/drop wavelength-division multiplexed filter device for a single, specified frequency.

3. The multi-function optical filter according to claim 1 acting as an optical channel passing filter, further comprising an optical circulator and an optical coupler or an optical combiner, to function as an add/drop wavelength-division multiplexed filter device for wide frequency band.

4. The multi-function optical filter according to claim 1 acting as an optical bandpass filter, further comprising an optical circulator and an optical coupler or an optical combiner, to function as band selective add/drop wavelength-division multiplexed filter device for wide frequency bands.

5. The multi-function optical filter according to claim 1 further comprising additional multi-functional filters to constitute an array of filters having a specified increasing spacing d, and an N-port optical circulator, thereby functioning as a grating or wavelength router.

6. A general multi-function optical filter comprising:
   a modified Michelson interferometer or Tynman-Green interferometer having an optical path length difference $\eta_1 \Delta L$ between two arms, where $\eta_1$ is an effective index of refraction of the interferometer's arms; and
   a Gires-Toumois resonator (GTR) with resonator optical spacing $\eta_2 d$, where $\eta_2$ is an effective index of refraction of a resonator medium and front surface reflectance R, in which the GTR replaces one of reflecting mirrors of the interferometer, so that the optical filter functions as an optical Channel Passing filter when a ratio γ between $\eta_1 \Delta L$ and $\eta_2 d$ is equal to $n\lambda o/2d$, wherein n stands for any integer including 0 and $\lambda 0$ stands for an arbitrary fixed center wavelength of a light source.

7. The multi-function optical filter according to claim 6 that is cascaded to narrow further the linewidth of the said channel passing filter.

8. A general multi-function optical filter comprising:
   a modified Mach-Zehnder interferometer having an optical path length difference $\eta_1 \Delta L$ between two arms, where $\eta_1$ is an effective index of refraction of the interferometer's arms, an effective ring resonator perimeter length $\eta_3 p$, where $\eta_3$ is an effective index of refraction of a resonator medium, and a coupling power constant R1; and
   a ring resonator which is contained in one of the arms of a Mach-Zehnder interferometer, so that the optical filter functions as an optical Channel Passing filter when a ratio γ between $2(\eta_1 \Delta L)$ and $\eta_3 p$ is equal to $n\lambda o/p$, wherein n stands for an integer including 0 and $\lambda 0$ stands for an arbitrary fixed center wavelength of a light source.

9. The multi-function optical filter according to claim 8 that is cascaded to narrow further the linewidth of the said channel passing filter.

10. A general multi-function optical filter comprising:
   a modified Michelson interferometer or Tynman-Green interferometer having an optical path length difference $\eta_1 \Delta L$ between two arms, where $\eta_1$ is an effective index of refraction of the interferometer's arms; and
   a Gires-Toumois resonator (GTR) with resonator optical spacing $\eta_2 d$, where $\eta_2$ is an effective index of refraction of a resonator medium and front surface reflectance R, in which the GTR replaces one of reflecting mirrors of the interferometer, so that the optical filter functions as an optical Channel Dropping filter for some wavelength range Δλ when a ratio γ between $\eta_1 \Delta L$ and $\eta_2 d$ is equal to $(2n+1)\lambda 0/4d$ with n being an integer and $\lambda 0$ an arbitrary fixed center wavelength of a light source.

11. The multi-function optical filter according to claim 10 that is cascaded to widen further the linewidth of the said channel dropping filter.

12. A general multi-function optical filter comprising:
   a modified Mach-Zehnder interferometer having an optical path length difference $(\eta_1 \Delta L)$ between two arms, where $\eta_1$ is an effective index of refraction of the interferometer's arms, an effective ring resonator perimeter length $\eta_3 p$, where $\eta_3$ is an effective index of refraction of a resonator medium, and a coupling power constant R1; and a ring resonator which is contained in one of the arms of the Mach-Zehnder interferometer, so that the optical fiber functions as an optical Channel Dropping filter for some wavelength range $\Delta\lambda$ when a ratio $\gamma$ between $2(\eta_1\Delta L)$ and $\eta_3 p$ is equal to $(2n+1)\lambda 0/2p$ with n being an integer and $\lambda 0$ an arbitrary fixed center wavelength of a light source.

13. The multi-function optical filter according to claim 12 that is cascaded to widen further the linewidth of the said channel dropping filter.

14. A general multi-function optical filter comprising:

a modified Michelson interferometer or Tynman-Green interferometer having an optical path length difference $\eta_1\Delta L$ between two arms, where $\eta_1$ is an effective index of refraction of the interferometer's arms; and a Gires-Tournois resonator (GTR) with resonator optical spacing $\eta_2 d$, where $\eta_2$ is an effective index of refraction of a resonator medium and front surface reflectance R, in which the GTR replaces one of reflecting mirrors of the interferometer, so that the optical filter functions as a Bandpass filter when a ratio $\gamma$ between $\eta_1\Delta L$ and $\eta_2 d$ is equal to 0.5.

15. The multi-function optical filter according to claim 14 that is cascaded to further modify the linewidth of the said bandpass filter.

16. A general multi-function optical filter comprising:

a modified Mach-Zehnder interferometer having an optical path length difference $(\eta_1\Delta L)$ between two arms, where $\eta_1$ is an effective index of refraction of the interferometer's arms, an effective ring resonator perimeter length $\eta_3 p$, where $\eta_3$ is an effective index of refraction of a resonator medium, and a coupling power constant R1; and a ring resonator which is contained in one of the arms of the Mach-Zehnder interferometer, so that the optical filter functions as a Bandpass filter when a ratio $\gamma$ between $2(\eta_1\Delta L)$ and $\eta_3 p$ is equal to 0.5.

17. The multi-function optical filter according to claim 16 that is cascaded to further modify the linewidth of the said bandpass filter.

* * * * *